United States Patent [19]

Lahiff

[11] Patent Number: 5,691,695

[45] Date of Patent: Nov. 25, 1997

[54] VEHICLE INFORMATION DISPLAY ON STEERING WHEEL SURFACE

[75] Inventor: John E. Lahiff, Farmington Hills, Mich.

[73] Assignee: United Technologies Automotive Systems, Inc., Detroit, Mich.

[21] Appl. No.: 686,107

[22] Filed: Jul. 24, 1996

[51] Int. Cl.⁶ ........................................... B60Q 3/00
[52] U.S. Cl. .................. 340/461; 340/439; 340/441; 340/459
[58] Field of Search ........................ 340/438, 439, 340/441, 459, 461, 462

[56] References Cited

U.S. PATENT DOCUMENTS

| | | | |
|---|---|---|---|
| 1,944,905 | 1/1934 | Rowell | 180/78 |
| 4,368,454 | 1/1983 | Pilatzki | 74/484 R |
| 4,464,933 | 8/1984 | Santis | 73/866.3 |
| 4,485,371 | 11/1984 | Yamada et al. | 340/438 |
| 4,608,550 | 8/1986 | Umebayashi et al. | 307/10.1 |
| 4,687,072 | 8/1987 | Komuro | 180/219 |
| 4,792,783 | 12/1988 | Burgess et al. | 307/10.1 |

*Primary Examiner*—Jeffery Hofsass
*Assistant Examiner*—Edward Lefkowitz
*Attorney, Agent, or Firm*—Howard & Howard

[57] ABSTRACT

A vehicle steering wheel is provided with a thin reconfigurable display such as an LED, an LCD, an electroluminescent display, or other types of reconfigurable thin display. Vehicle instrument information such as speedometer, fuel level, vehicle temperature, engine speed, etc. are provided on this display. The reconfigurable display is provided with a control that reconfigures the location of the information on the display. The control is provided with a signal indicative of rotation of the steering wheel, and the control takes that signal and adjusts the information such that the displayed information maintains a particular orientation relative to the horizontal during a turn. With the present invention, the vehicle operator need only consult the vehicle steering wheel to obtain information about the vehicle condition. There are thus less constraints on the design of the steering wheel, and in the requirement of providing visual access to the instrument panel.

14 Claims, 2 Drawing Sheets

VEHICLE INFORMATION DISPLAY ON STEERING WHEEL SURFACE

BACKGROUND OF THE INVENTION

This invention relates to a system for displaying vehicle operational information on the surface of the vehicle steering wheel.

The design of vehicle steering wheels and instrument panels are both compromised by the need to provide operator sight lines. The steering wheel has always had constraints in the size and arrangement of the spokes and rim since the operator must still be able to easily see an instrument panel positioned forwardly of the wheel. To this end, steering wheel designers have been somewhat constrained. As an example, many modern steering wheels have no spokes between the central portion of the wheel and the upper portion of the rim. The upper area is left open to provide the operator with maximum visual access to the instrument panel. This type of constraint on the arrangement of the structural spokes has sometimes affected the design of the steering wheel such that the designer has not been able to place structural members at desired locations.

The inclusion of airbags into the central portion of the steering wheel has further complicated the design of the steering wheel. The airbag requires a particular amount of space at the central portion of the steering wheel, thus requiring that the central portion be of at least a minimum size. Making the central portion of the wheel larger conflicts with the goal of providing a large open area, and maximum visual access to the instrument panel.

SUMMARY OF THE INVENTION

In a disclosed embodiment of this invention, a reconfigurable display is placed on the central portion of the steering wheel. The display may include all of the information typically displayed on the instrument panel. Thus, the operator need no longer have visual access to the instrument panel. The steering wheel designer is thus free to place steering wheel frame and structural elements at any desired location. The display is preferably an LED, a LCD, an electro-luminescent display, or another type reconfigurable thin display. Alternatively, the display may be in addition to the instrument panel, rather than as the sole display.

One potential concern with simply mounting a display on the steering wheel is that the steering wheel, and thus the display, will turn during operation of the vehicle. Having a shifting display could prove distracting to the driver. The present invention addresses this concern by providing a control for the reconfigurable display provided with feedback of the amount the wheel has turned. The control adjusts the display such that the display adjusts when the wheel turns. Thus, if the wheel turns 10 degrees in one particular direction, the display is adjusted to maintain a level appearance. The technology for reconfiguring the display is well known in the art of thin displays, and forms no portion of this invention.

Several protocols for changing the displays are disclosed. In one protocol embodiment, each display element pivots at its location such that it maintains an orientation parallel to the horizontal.

In a second protocol, the approximate location of each display remains constant during the turn. Thus, each element of the display scrolls along the display panel against the turn. In this way, the approximate position of the display element remains relatively fixed. An operator seeking to check a particular piece of information has traditionally checked the instrument panel. The information is fixed on the instrument panel, and thus the operator is able to look at a particular location. That is, the speedometer is always at the same place, regardless of whether or not the operator is turning the vehicle.

This second protocol achieves a similar function with the main information elements. Some elements may be lost from the display during the scrolling. However, in this protocol the outermost displayed information elements are those to which the operator need not always have access. As an example, the temperature of the vehicle, or the fuel level, may sometimes move off of the display during this second protocol until the wheel returns. The operator is still provided with the more important information, such as vehicle speed.

In a third disclosed protocol, the reconfigurable display has a hierarchy of information elements. The higher level elements are maintained in a location on the display such that they are accessible to the operator. As an example, the designer may determine that speed and fuel level are more important than RPM or engine temperature. Thus, during a turn, the speedometer and fuel level are maintained on the display at a prominent location, while the RPMs or vehicle temperature may move off the display, or may be displayed in a less prominent location.

Further, turns beyond a certain range may not require any further adjustment. As an example, it is unlikely that an operator making an approximately 90 degree turn would be consulting the instrument display during that turn. For that reason, the system may avoid further adjustment once a particular range of turn is reached, and turns over a particular angle may not require further adjustment. The exact angle for which adjustment is no longer required may, of course, vary.

These and other features of the present invention will be best understood from the following specification and drawings, of which the following is a brief description.

DETAILED DESCRIPTION OF THE PREFERRED EMBODIMENT

Figure 1:
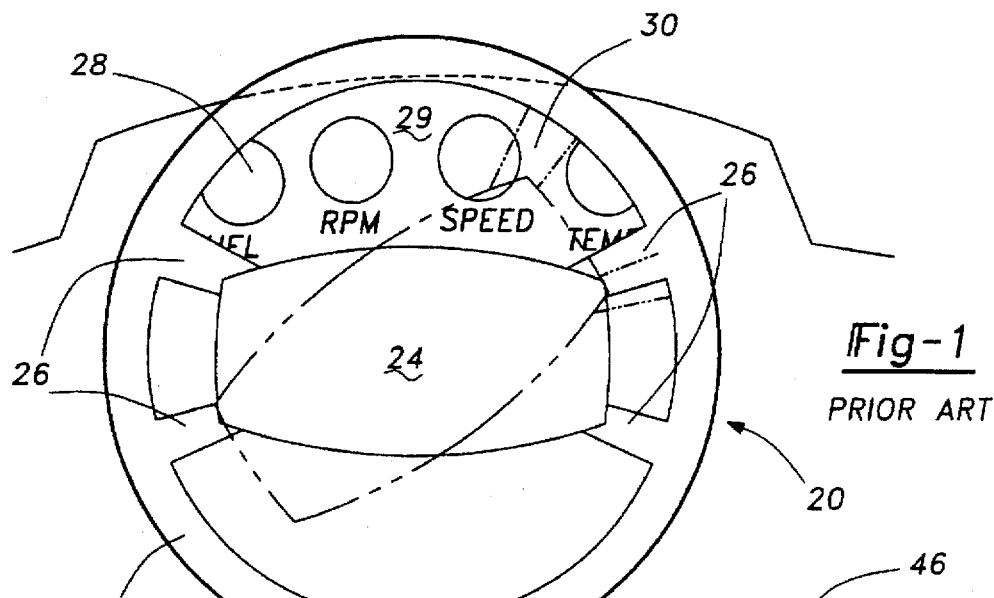
FIG. 1 is a view of a prior art steering wheel assembly.

A prior art steering wheel 20 is illustrated in FIG. 1. A rim 22 is formed around a central portion 24 which typically houses an airbag. A plurality of spokes 26 connect central portion 24 to the rim 22. An instrument panel 28 is positioned forwardly of the steering wheel 20, and displays a plurality of information elements to the operator. An open space 29 is typically provided between the rim 22, the central portion 24, and spokes 26. Open space 29 is typically maintained sufficiently large to allow the operator to see instrument panel 28.

During a turn, the spokes 26 turn with the wheel. Thus, a spoke may be moved to a position such as shown in phantom at 30, wherein one of the information elements is partially blocked by the wheel. Due to this, vehicle steering wheel designers have sometimes been constrained against putting spokes or other structural components at desired locations.

Figure 2:
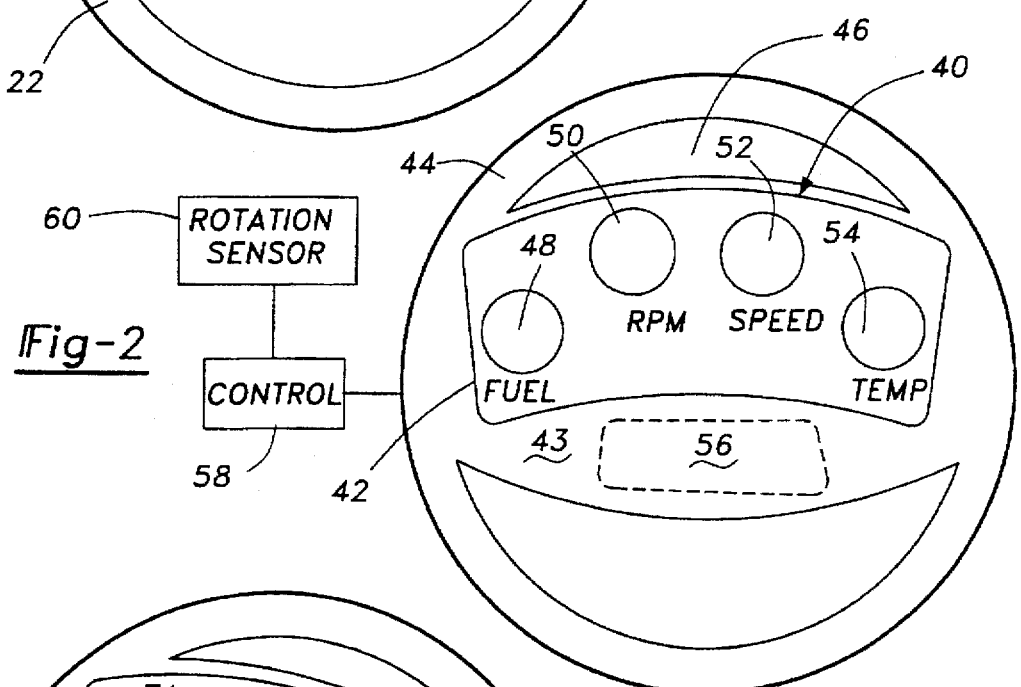
FIG. 2 is a schematic view of an inventive system.

As shown in FIG. 2, the inventive steering wheel 40 addresses these concerns by incorporating a display 42 at a central portion 43. The rim 44 still surrounds the central portion 43, and a space 46 remains between the rim 44 and the central portion 43 such that an operator may easily grip the wheel. The display 42 may be a reconfigurable LED, a LCD, an electro-luminescent display, or another type of reconfigurable thin display. The display may incorporate a fuel element 48, an engine revolution element 50, a speedometer element 52, and a temperature element 54. The particular information elements provided are exemplary, and other information element may also be incorporated on the display 42. As shown, an airbag 56 is placed within the central portion 43. The airbag 56 is illustrated below the display 42, however, the display 42 may also overlie the airbag 56 in certain applications. In such an arrangement, the display 42 should preferably be provided with a perforation or tear strip such that when the airbag 56 is actuated, the display 42 provides no impediment to deployment.

A control 58 controls the display 42. The control 58 adjusts the location of the displays 48–54 in response to a turn. The technology for actually changing the display is well known in the art. A rotation sensor 60 provides feedback information to control 58 about the degree of turn of the wheel 40. The turn feedback may be provided by a component utilized for other vehicle applications to monitor turns, or alternatively may be a dedicated element solely for the purpose of adjustment of the display 42. The technology necessary to determine the amount of turning is as known in the art, and forms no portion of this invention.

As the wheel 40 turns, the orientation of the informational components 48–54 on the display 42 is adjusted. Any one of several protocols may be utilized for this adjustment. Applicant has identified three, although others may also be utilized.

Figure 3:
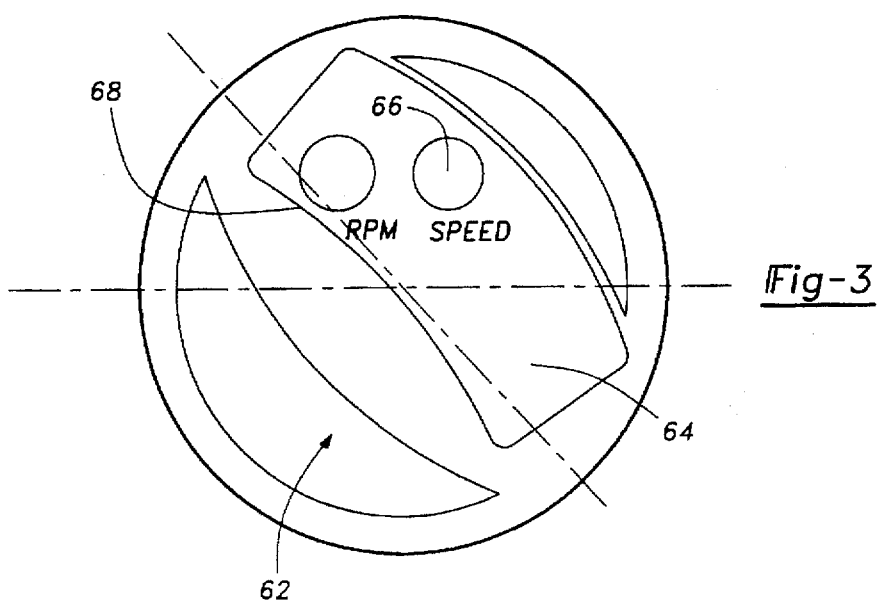
FIG. 3 shows a first adjustment protocol.

In the protocol shown in FIG. 3, the real location of the informational components is maintained relatively stationary in space. Thus, as the wheel 62 goes through an approximate 45 degree turn, the location of the informational component scrolls along the display 64. The orientation of the information is also reconfigured to maintain it parallel to the horizontal. Thus, in this clockwise turn, the actual location on the display unit for the speedometer 66 and RPM 68 will move upwardly and to the left to maintain its actual position in space stationary. An operator knowing that the speedometer is in a particular location will then be able to check that location and find the speedometer, and will always know where to find the information.

The functional result of this protocol is that some of the display components may scroll off of the display. As shown, the fuel component is no longer displayed, but has instead moved off of the display 64. Once the wheel 62 returns to its normal position, the displays will return to the position shown in FIG. 2, and all four of the information elements will again be displayed on the wheel.

Figure 4:
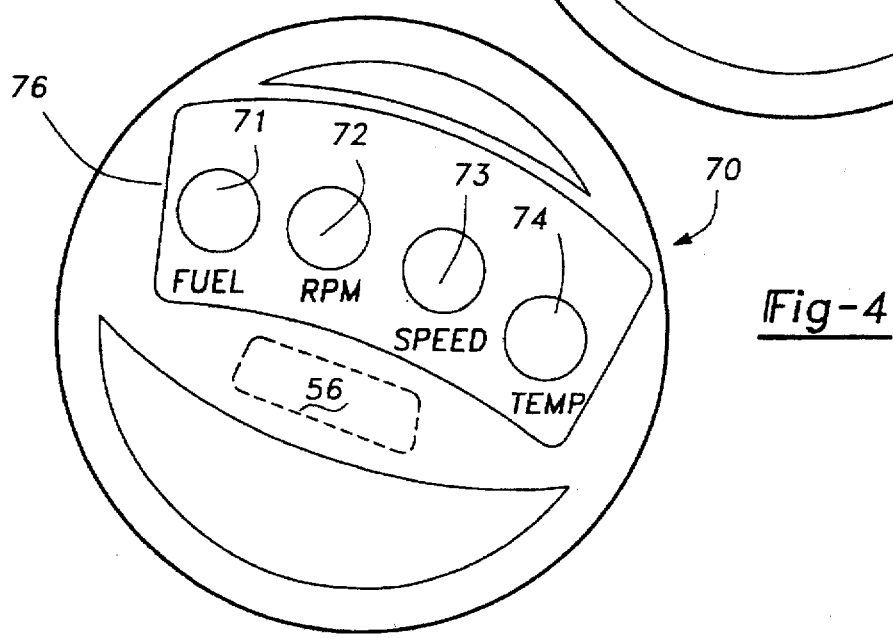
FIG. 4 shows a second adjustment protocol.

FIG. 4 shows a second protocol that is an alternative to that shown in FIG. 3. As shown, the wheel 70 has turned clockwise to an approximately 30 degree turn. The information elements 71–74 have remained at the approximate same position on the display 76, but have merely rotated approximately 30 degrees. In this way, the operator is still provided with each informational component in a proper orientation relative to the horizontal.

Figure 5:
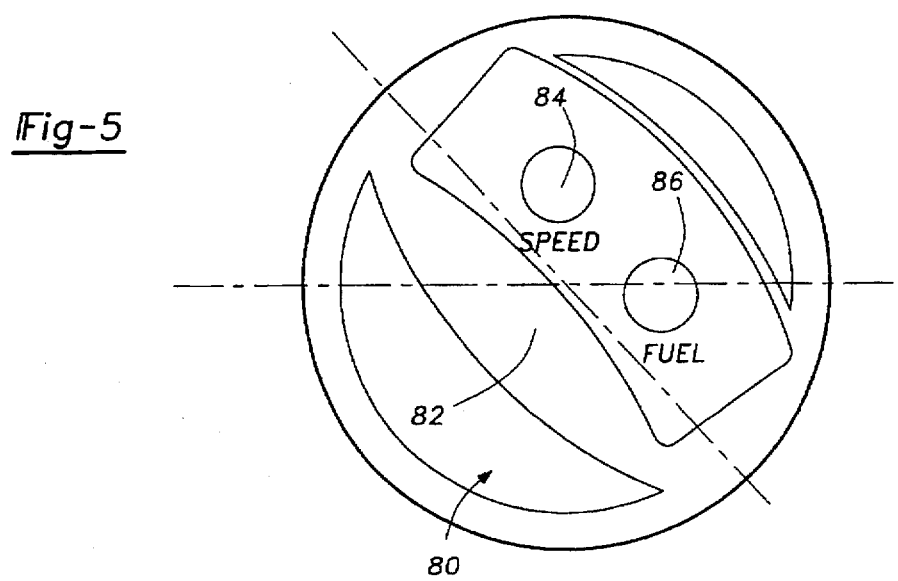
FIG. 5 shows a third adjustment protocol.

FIG. 5 shows a third protocol on steering wheel 80. In the third protocol, the display unit 82 is provided with a hierarchy of the displays to maintain on the display unit. Thus, it may be determined that during a turn, the most important components to display to the operator are speed 84 and fuel level 86. The display unit 82 maintains the display of those two higher level components during a turn in a prominent position. With this protocol the orientation is also maintained parallel to the horizontal. The other components may be displayed at the less prominent position such as the lower right end of the display 82.

It may also be determined that during a complete turn, an operator has no need in viewing the information. For that reason, during a turn beyond a particular number of degrees (e.g., 60 degrees), no further adjustment of the display may be necessary. Instead, there may be an end of rotation range, and after that range is reached, no further reconfiguration of the display is provided.

As set forth above, the hardware and software necessary to achieve this invention are known. A worker of ordinary skill in this an will be able to design a suitable system. If a glass cover is utilized for the thin display, the glass is preferably formed of shatterproof glass or with shatter resistant coatings for safety purposes. The display is provided with appropriate communication through the steering column to the monitoring apparatus on the vehicle to provide the necessary display information to the control. As an example, signals with regard to the speed, temperature, RPM and fuel level are all provided to the control, which can in turn communicate with the display. Although the control is only specifically illustrated in FIG. 2, it should be understood that the control and turn feedback sensor are incorporated into the systems illustrated in FIGS. 3–5.

A preferred embodiment of this invention has been disclosed, however, a worker of ordinary skill in the art would recognize that certain modifications would come within the scope of this invention. For that reason, the following claims should be studied to determine the true scope and content of this invention.

I claim:

1. A vehicle steering wheel comprising:

a steering wheel body having a central portion and an outer rim connected for rotation with said central portion;

a reconfigurable display unit placed on said central portion, and rotating with said central portion and said outer rim; and a control for providing information to said display unit, said control causing said display unit to display said information on said central portion of said steering wheel, said control monitoring rotation of said steering wheel body and reconfiguring the orientation of said display information on said display unit to maintain said information relatively horizontal in orientation relative to an operator.

2. A steering wheel as recited in claim 1, wherein said control stops reconfiguring orientation once a predetermined range of turn has been exceeded.

3. A steering wheel as recited in claim 1, wherein said control rotating said information on said display unit in response to rotation, but not causing said information to move relative to said wheel.

4. A steering wheel as recited in claim 1, wherein said control maintaining said information in an approximately stationary position in space during rotation.

5. A steering wheel as recited in claim 4, wherein said control scrolling some information off of said display unit during rotation.

6. A steering wheel as recited in claim 1, wherein said control assigning a hierarchy of a higher level to at least some elements of said information, and maintaining said higher level information elements displayed on said display at a prominent location during a turn.

7. A method of providing information to a vehicle operator comprising the steps of:
   1) providing a vehicle steering wheel having a reconfigurable display which rotates with said vehicle steering wheel, and a sensor for sensing rotation of said steering wheel;
   2) monitoring rotation of said steering wheel with said sensor, and providing a signal of said steering wheel turning to a control for said display;
   3) reconfiguring said display to adjust for rotation of said steering wheel such that said displayed information maintain a particular orientation relative to the horizontal during the turning of said steering wheel.

8. A method as recited in claim 7, wherein said reconfiguration includes moving said displayed information such at least some elements of said displayed information maintain a relatively constant location in space during said rotation.

9. A method as recited in claim 7, wherein an upper limit of rotation is set, and further reconfiguration under step 3) is ceased when said upper limit is exceeded.

10. A method as recited in claim 7, wherein said reconfiguration of step 3) includes maintaining the orientation of elements of said displayed information generally parallel relative to the horizontal.

11. A vehicle steering wheel comprising:
    a vehicle steering wheel body having a central portion and an outer rim connected for rotation with said central portion;
    a reconfigurable display unit placed on said central portion to rotate with said central portion and said outer rim;
    a sensor for monitoring rotation of said steering wheel body; and
    a control receiving signals from said sensor, said control controlling the information to be displayed on said display unit, said control unit causing said display to display information on said central portion of said steering wheel with regard to operational information of said vehicle, and said control reconfiguring the orientation of said displayed information in response to signals from said sensor to maintain a relatively constant horizontal orientation.

12. A vehicle steering wheel as recited in claim 11, wherein said display unit comprises an LED.

13. A vehicle steering wheel as recited in claim 11, wherein said display unit is an LCD.

14. A vehicle steering wheel as recited in claim 12, wherein said control includes an upper limit, and once said amount of rotation exceeds said upper limit, further reconfiguration of said displayed information is ceased.

* * * * *